Aug. 16, 1927.

1,638,914

A. P. BRUSH

DIRECTION AND DISTANCE MEASURING INSTRUMENT

Filed Dec. 20, 1926        3 Sheets-Sheet 1

INVENTOR
Abbott P. Brush
BY
Philip S. McLean
ATTORNEY

Aug. 16, 1927.                                                   1,638,914
                         A. P. BRUSH
            DIRECTION AND DISTANCE MEASURING INSTRUMENT
                    Filed Dec. 20, 1926        3 Sheets-Sheet 2
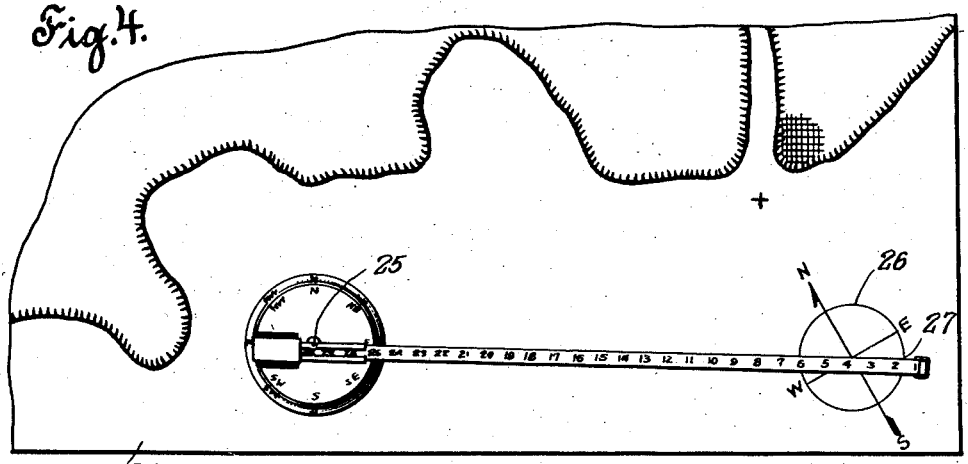
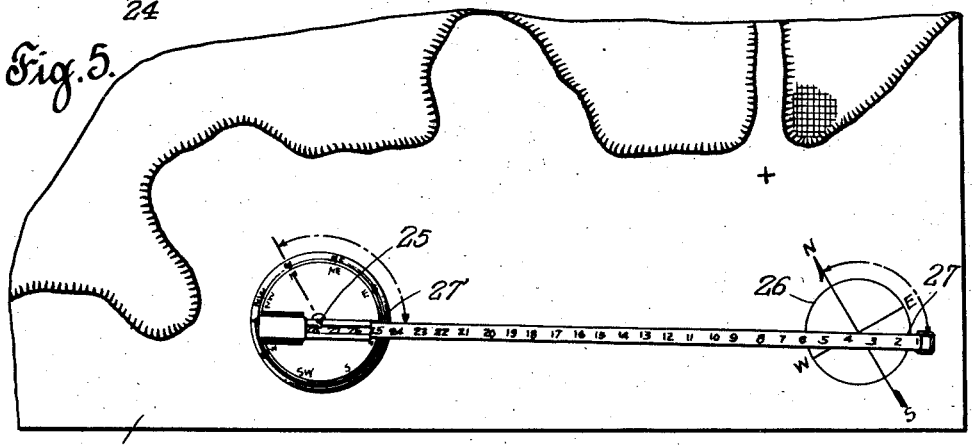
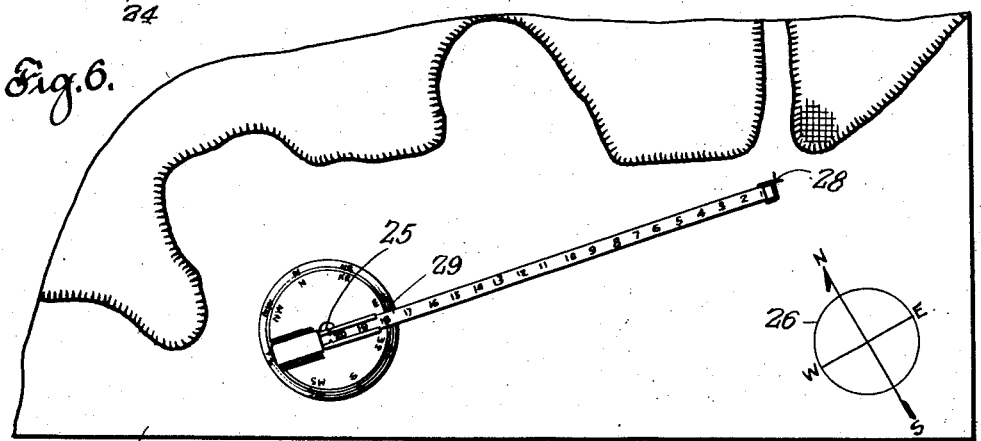
INVENTOR
Abbott P. Brush
BY
Philip S. McLean
ATTORNEY

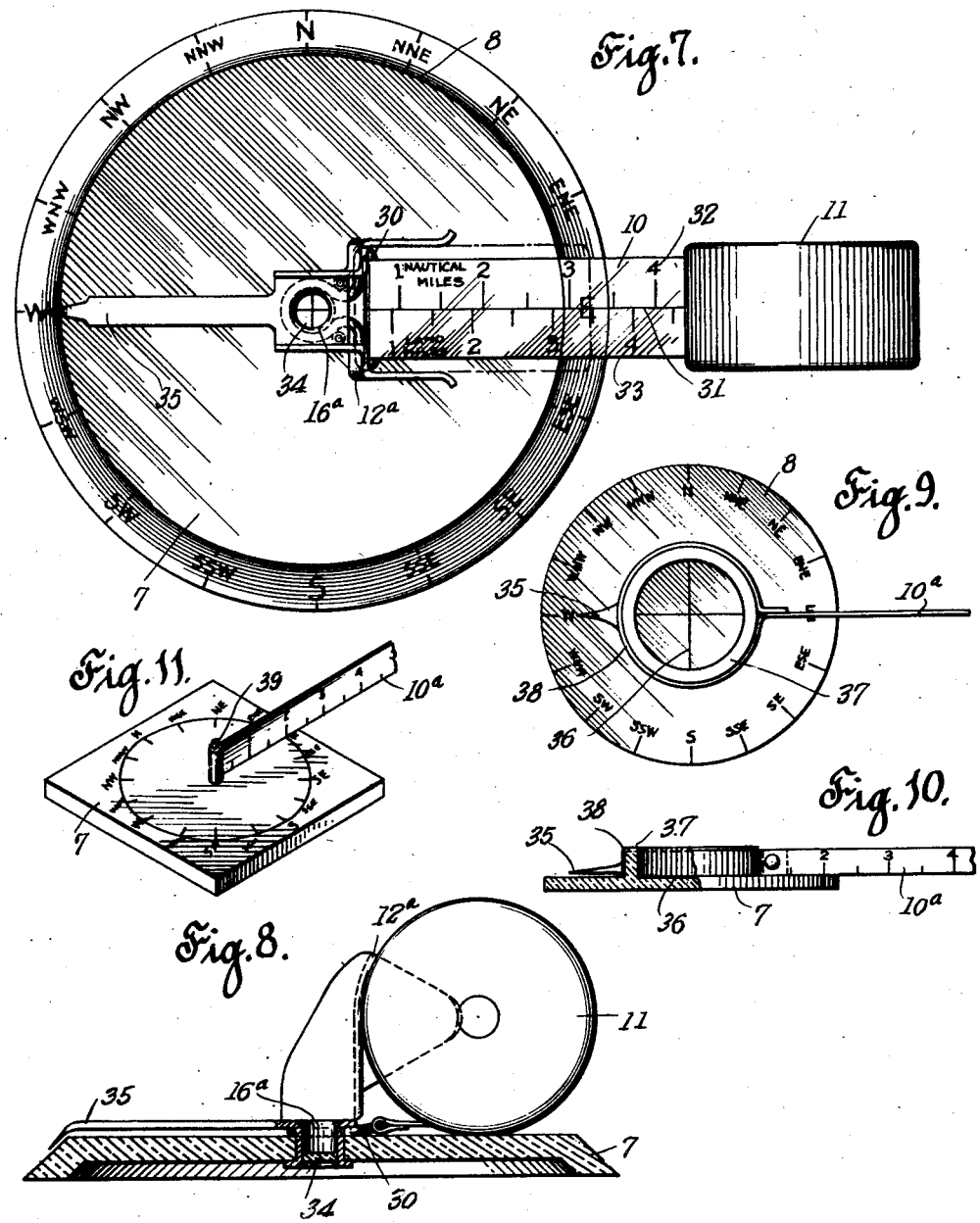

Patented Aug. 16, 1927.

1,638,914

UNITED STATES PATENT OFFICE.

ABBOTT P. BRUSH, OF GREENWICH, CONNECTICUT.

DIRECTION AND DISTANCE MEASURING INSTRUMENT.

Application filed December 20, 1926. Serial No. 155,811.

The objects of this invention are to provide an instrument for indicating direction and distance between separated points on a chart or map, which will give such information immediately by direct reading, which will be easy to use, relatively simple and inexpensive in its structure and entirely practical in every way.

The foregoing and other desirable objects are attained in this invention by certain novel features of construction, combination and relation of parts as hereinafter set forth and broadly claimed.

The drawings accompanying and forming part of this specification illustrate a practical embodiment and show certain uses of the invention, but the invention is not to be restricted to this particular form or uses, as will be apparent from the scope of the claims.

Figures 4, 5 and 6 are views illustrating the method of using the device on a chart to find direction and distance between points of location and destination.

Figures 7, 8 and 9, 10 are plan and side sectional views of forms of the invention. Figure 11 is a perspective view of another form.

Figure 1:
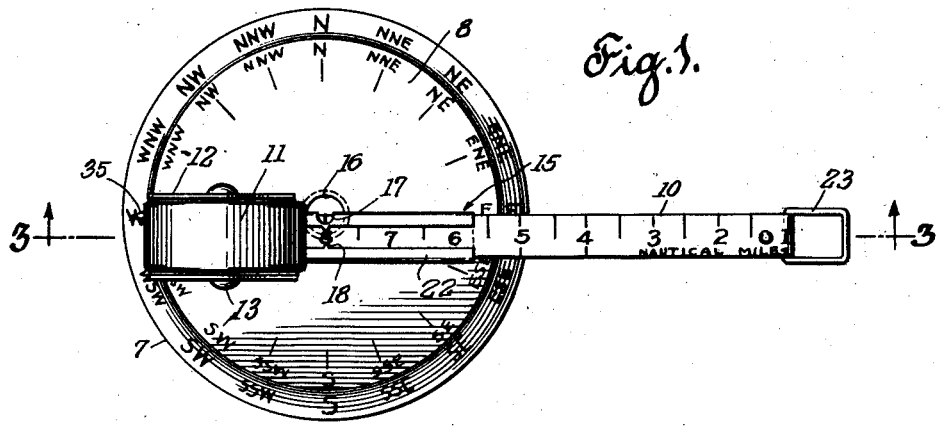
Figure 1 is a plan view of the instrument.
Figure 2:
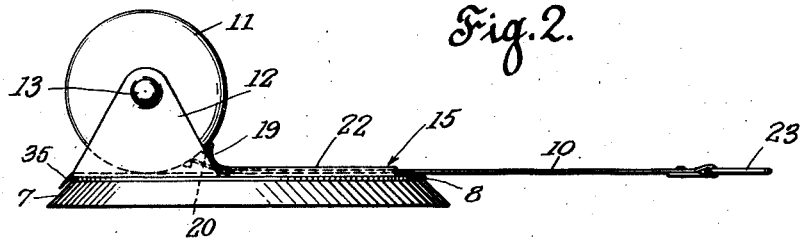
Figure 2 is a side elevation of the same.

As herein disclosed, the instrument is constructed with a circular base 7, which may be heavy enough to act as a paper weight and to in effect "anchor" itself in any position in which it may be placed upon a chart. This base carries the compass readings, as indicated, either directly thereon or by means of a compass card 8 suitably secured on the base. In the center of the base is an opening 9 to enable the central positioning of the base over the point of location or starting point.

Mounted in swivelled relation upon the base is the direction indicating and measuring element in the form of a flexible tape 10 wound on a spring roll within the case 11. The spring winding mechanism of this tape may be of any of the forms now on the market and for that reason this part of the device is not illustrated in detail. The casing of this spring wound tape is shown as of generally circular outline and it is indicated as detachably mounted in a holder consisting of upstanding spring lugs or posts, 12, forming the sides or jaws of a spring gripping device, these jaws having outwardly punched bosses 13 forming seats for corresponding bosses or lugs 14 on the sides of the case. This construction, it will be seen, permits of the spring tape being readily removed from or placed in the holder.

Figure 3:
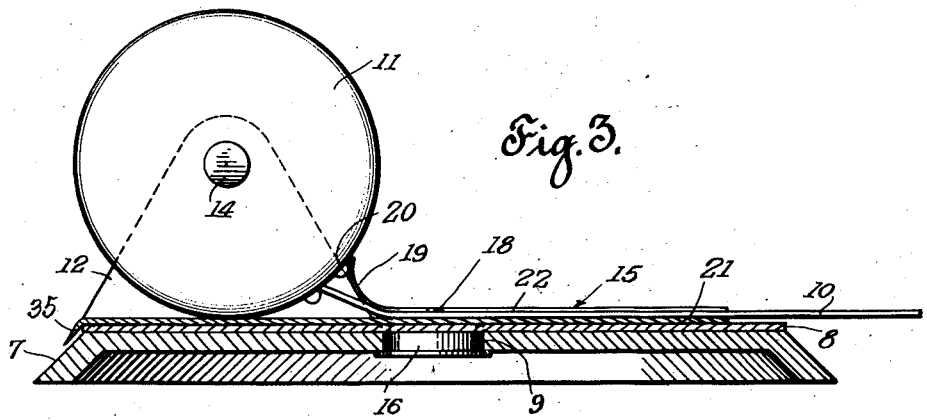
Figure 3 is an enlarged vertical sectional view as on the line 3—3 of Figure 1.

As best shown in Figure 3, the tape passes from the holder through a guide 15 arranged diamterically of the base and having a dependent central tubular portion 16 swivelled in the opening 9 in the base. The edge of this guide is shown notched or cut away at 17 so as to expose the edge of the tape where it crosses the center of the openings, Figure 1, and opposed marker points 18 are shown provided at the opposite edges of the guide to read on that portion of the tape in line with the axis of the opening.

The strip of tape issuing from the case is ordinarily sufficient to prevent the case from rotating in its holder but positive means for the purpose is shown provided in Figure 3 in the form of a lip 19 extended upwardly from the guide to engage the bead 20 at the edge of the slot where the tape issues from the casing.

The guide and support for the tape is indicated as made from a single piece of sheet metal having a flat base portion 21 extending substantially the full diameter of the base and having, at one side of the center, the upstanding wings for holding the tape case and extending from this holder across the center toward the opposite edge of the base, the upwardly and inwardly bent edges 22 forming overstanding guide fingers for the extended portion of the tape. The tape is shown as having a finger loop 23 which, by engagement with the end of the guide, may act as a stop to prevent the spring roll from pulling the tape back out of the guideway.

The tape or measuring strip is laid out in suitable units of linear measure, such as miles or knots and on a scale corresponding to that of the chart. Government marine charts are usually on either one of two different scales so the device may be usable with charts of either scale by having two different spring tapes, one of each scale, and using them interchangeably as may be required in the swivelled holder. The open top character of the guide permits of the tape being readily engaged therein or removed therefrom by flexing it on the center line so as to catch the edges of the same beneath the overstanding edge portions of the guide or conversely, to clear the edges from beneath such overstanding portions. The case of the tape is positioned by simply forcing it between the spring arms until held in the seats provided therefor and is removed by simply pulling it out of the grip of such arms.

The supporting of the tape at the rear end of the guide and on the opposite side of the center from said guide enables the distance reading to be taken at the center of the device as plainly shown in Figure 1.

The usual method of using the device to ascertain direction and distance is indicated in Figures 4 to 6. The first of these views shows how the device is placed upon the chart 24 with the opening in the base centered over the point of present location, designated as 25. With the base thus located, the tape is drawn out as a straight edge intersecting the center of the compass markings 26 which are always provided on these charts. The compass point marked by the far edge of the tape is then noted at 27 and the base of the device is turned as indicated in Figure 4 to bring the corresponding compass reading 27' on the base in line with the edge of the tape. The base of the protractor is thus quickly given the proper compass position over the spot from which direction and distance are to be indicated and measured. It is then only necessary to carry the end of the tape over to the point of destination indicated at 28 whereupon the point of crossing the compass card at 29 will give the exact direction and the reading of the tape at the center of the card will give the distance.

The base of the device may be made heavy enough so that it will stay in position by itself when the tape is withdrawn to distant points on the chart and instead of turning the entire base to orient the device, the card 8 which carries the compass markings may be swivelled on the base about the tubular neck 16 of the guide so that it may be turned independently of the base and be held in adjusted relation, for instance, by the fingers of one hand while the end of the tape is being positioned by the other hand. The change from one scale of chart to another can be quickly made by simply substituting tapes or measuring strips of different scales, the same being readily interchangeable in the swivel guide and holder.

Figures 7 and 8 illustrate a form of the invention in which the base is made of transparent material so that figures on the chart can be viewed therethrough and in which the end of the tape is made fast to the center of the base and the body or reel of the tape is pulled out to unwind the tape as far as required. In this case the swivel 16ª carries upstanding spring arms 12ª forming a holder to grip the case 11 when it is returned to the base. The end of the tape is shown held by a loop 30 caught beneath the head of the swivel and turning therewith and the tape is indicated as a transparent ribbon having its center line 31 in register with the center of the base. Scales 32, 33 of different readings are shown disposed at opposite sides of this center line and the eyelet is shown as carrying a glass 34 with cross lines thereon for registering the base over the starting point.

For assistance in getting the directional readings the swivelled attaching or supporting member may carry a rearwardly extending arrow or pointer as indicated at 35, reading on the opposite edge of the base from the tape.

Figures 9 and 10 illustrate how the tape, here designated 10ª, may be arranged on edge. In this case different scales may be printed on the opposite faces of the tape and the end of the tape be twisted one way or the other to bring either scale into a position for reading. In this construction also the base is made as a single piece of transparent material with cross lines 36 marked at the center of the same and with an upstanding circular or annular shoulder 37 about which the end of the tape is rotatably engaged. This rotatable connecting portion 38 of the tape may be an integral extension or be formed as a separate collar attached to the end of the tape and sliding freely about the swivel shoulder on the base. This form of the invention, it will be seen, consists of but the two parts, the base and the tape having a looped terminal swivelled on a shoulder on the base. The arrangement of the tape on edge is particularly easy to read and does not obscure any of the markings of the chart over which it passes. The tape in this last construction may be wound on a reel, or not, as found most desirable.

Figure 11 illustrates a simplified form of the invention in which the base is made of transparent material, such as celluloid, substantially square in shape with the compass markings arranged circularly thereon and the tape pivotally connected at the center with a pin or peg 39 driven or otherwise secured in the base. This square or parallel sided form of base has the advantage of providing a form about which the tape may be readily wrapped. The transparency of the base enables the chart to be viewed therethrough and the pin serves as a centering device for locating the base on the chart.

What is claimed is:

1. In an instrument of the character disclosed, a base carrying compass indications, means on said base for positioning the same with the compass indications centered over a point on a chart and a flexible flat tape having distance markings for said chart on the flat side thereof, said flat tape being pivotally connected at one end with said base in position to swivel about the center of the compass indications on the base, the base being heavy and of large enough size to form a substantial anchorage for the tape, said base being formed of transparent material so that the chart markings surrounding the point over which the base is located may be viewed therethrough and in respect to the direction in which the tape is drawn.

2. In an instrument of the character disclosed, a flat base of transparent material carrying compass indications, a pin set in the center of said indications and a measuring tape carrying the designations of the scale of a marine chart, said tape being pivotally connected with said pin so that it may be readily swung about the same as a center.

3. In an instrument of the character disclosed, a flat base carrying compass indications, a pin set in the center of said indications and a measuring tape carrying the designations of the scale of a marine chart, said tape being pivotally connected with said pin so that it may be readily swung about the same as a center and standing on edge with respect to the base, said base being of a generally angular outline to serve as a form for winding the tape thereover.

4. A marine navigational instrument for use over a marine chart which is laid out to scale, comprising a base carrying the compass markings, means on said base at the center of said compass indications for positioning the base with said compass markings centered over a position on the chart, a flat flexible tape having distance measurements marked thereon on a scale corresponding to the scale of the chart, said tape being pivotally connected with said centering means so as to swing about the center of the compass indications on the base and being connected to stand on edge with respect to the base so as to present a straight line, viewed from above the base.

In witness whereof, I have hereunto set my hand this 2nd day of December, 1926.

ABBOTT P. BRUSH.